United States Patent
Graas et al.

(10) Patent No.: US 12,142,392 B2
(45) Date of Patent: Nov. 12, 2024

(54) DRAW-ROD BUSHING WITH SEALED BOTTOM CONTACT

(71) Applicant: HITACHI ENERGY LTD, Zürich (CH)

(72) Inventors: Fredrik Graas, Borlänge (SE); Jesper Calpson, Ludvika (SE); Alejandra Ravanal, Smedjebacken (SE); David Emilsson, Ludvika (SE); Peter Sjöberg, Ludvika (SE); Zoltan Repasi, Västerås (SE)

(73) Assignee: HITACHI ENERGY LTD, Zurich (CH)

( * ) Notice: Subject to any disclaimer, the term of this patent is extended or adjusted under 35 U.S.C. 154(b) by 449 days.

(21) Appl. No.: 17/633,338

(22) PCT Filed: Nov. 20, 2020

(86) PCT No.: PCT/EP2020/082817
§ 371 (c)(1),
(2) Date: Feb. 7, 2022

(87) PCT Pub. No.: WO2021/099535
PCT Pub. Date: May 27, 2021

(65) Prior Publication Data
US 2022/0293302 A1    Sep. 15, 2022

(30) Foreign Application Priority Data
Nov. 20, 2019  (EP) .................................... 19210357

(51) Int. Cl.
*H01B 17/30* (2006.01)
*H01F 27/04* (2006.01)
*H02G 15/04* (2006.01)

(52) U.S. Cl.
CPC ......... *H01B 17/308* (2013.01); *H01B 17/303* (2013.01); *H01F 27/04* (2013.01); *H02G 15/046* (2013.01)

(58) Field of Classification Search
CPC ...... H01B 17/303; H01B 7/30; H01B 17/308; H01B 17/28; H01F 27/04; H02G 15/072; H02G 15/046; H02G 15/013; H02G 15/04
See application file for complete search history.

(56) References Cited

U.S. PATENT DOCUMENTS 4,202,998 A * 5/1980 Cronin ................... H02G 15/30
174/31 R
6,074,229 A * 6/2000 Johansson .............. H02G 15/06
439/886

(Continued)

FOREIGN PATENT DOCUMENTS

| CN | 102568757 A | 7/2012 |
|---|---|---|
| CN | 108701910 A | 10/2018 |

(Continued)

OTHER PUBLICATIONS

International Search Report and Written Opinion of the International Searching Authority, PCT/EP202/082817, mailed Jan. 25, 2021, 10 pages.

(Continued)

*Primary Examiner* — Steven T Sawyer
(74) *Attorney, Agent, or Firm* — Sage Patent Group

(57) ABSTRACT

The present disclosure relates to a bushing comprising a conductor tube, a support tube, arranged within the conductor tube, a draw-rod configured to run through the support tube, and a contact arrangement arranged to be drawn into the conductor tube by the draw-rod. The contact arrangement comprises a sealing plug arranged for sealingly engag- (Continued)

ing an inside wall of the conductor tube to prevent liquid from passing the sealing plug into the conductor tube.

20 Claims, 4 Drawing Sheets

(56) References Cited

U.S. PATENT DOCUMENTS

| | | | | |
|---|---|---|---|---|
| 7,825,331 | B2* | 11/2010 | Allais | H02G 15/34 |
| | | | | 16/2.2 |
| 10,236,672 | B2* | 3/2019 | Tan | H01R 13/53 |
| 2010/0018753 | A1 | 1/2010 | Larsson et al. | |
| 2012/0071014 | A1* | 3/2012 | Dais | H01B 17/28 |
| | | | | 439/181 |
| 2018/0102205 | A1 | 4/2018 | Sjöberg et al. | |

FOREIGN PATENT DOCUMENTS

| | | |
|---|---|---|
| EP | 2117016 A1 | 11/2009 |
| GB | 1562092 A | 3/1980 |

OTHER PUBLICATIONS

Chinese Office Action, Chines Application No. 202080061035X, mailed May 9, 2023, 2 pages.
Summary of Office Action, Han Kun Law Offices, mailed May 22, 2023, 2 pages.

* cited by examiner

DRAW-ROD BUSHING WITH SEALED BOTTOM CONTACT

CROSS-REFERENCE TO RELATED APPLICATIONS

This application is a 35 U.S.C. § 371 national stage application of PCT International Application No. PCT/EP2020/082817 filed on Nov. 20, 2020, which in turn claims foreign priority to European Patent Application No. 19210357.0, filed on Nov. 20, 2019, the disclosures and content of which are incorporated by reference herein in their entireties.

TECHNICAL FIELD

The present disclosure relates to an electrical bushing comprising a draw-rod system.

BACKGROUND

Bushings with a draw-rod system which are connected to a liquid-filled electrical device, such as an oil-filled transformer, are typically allowing the insulation liquid to enter the bushing since the draw-rod operates through a tube-formed electrical conductor in the bushing and into the electrical device. The bushing is thus typically sealed against the electrical device to prevent the liquid from leaking out from the electrical device via the draw-rod bushing.

Even though a bushing is sealed to prevent leakage of the insulation liquid, there may be an increased risk of leakage compared with a bushing where the insulation liquid is not allowed to enter the conductor tube of the bushing. For instance, if the bushing is arranged between a transformer tank and a valve hall of a power electronic converter, leakage may increase the risk of a potentially catastrophic fire in the valve hall.

However, in order to prevent the insulation liquid from entering the conductor tube, it is today not possible to use a draw-rod system for connecting the contact in the electrical device to the conductor tube in the bushing. Rather, a manhole in the transformer tank may be needed in order to connect the bushing contact inside the transformer tank.

EP2117016A1 discloses a draw-rod mounting for a high voltage bushing.

SUMMARY

It is an objective of the present disclosure to provide a bushing with a draw-rod system, which is able to prevent insulation liquid from entering the conductor tube when connected in a liquid-filled electrical device.

According to an aspect of the present disclosure, there is provided a bushing comprising a conductor tube, a support tube, concentrically arranged within the conductor tube, a draw-rod configured to run through the support tube, and a contact arrangement arranged to be drawn into the conductor tube by the draw-rod. The contact arrangement comprises a sealing plug arranged for sealingly engaging an inside wall of the conductor tube to prevent liquid from passing the sealing plug into the conductor tube.

According to another aspect, there is provided a power station comprising an electrical equipment, and an embodiment of the bushing of the present disclosure arranged through a wall of the electrical equipment.

According to another aspect, there is provided a method of electrically connecting a contact arrangement to a conductor tube of a bushing. The method comprises, by means of a draw-rod running through a support tube concentrically arranged within the conductor tube, pulling the contact arrangement into the conductor tube until an electrical contact of the contact arrangement electrically connects with the conductor tube and a sealing plug of the contact arrangement sealingly engages an inside wall of the conductor tube, preventing liquid from passing the sealing plug into the conductor tube.

By means of the draw-rod system, the bushing may be more quickly and easily mounted to the transformer. However, the conventionally used draw-rod system allows liquid of the transformer tank to pass into the conductor tube of the bushing. By means of the contact arrangement comprising a sealing plug, the contact arrangement can prevent insulation liquid, e.g. transformer oil, from entering the conductor tube in the bushing, while still enabling the use of a draw-rod system to obviate the need to manually enter the electrical device when the bottom contact of the bushing is connected in said electrical device, e.g. a liquid-filled transformer. To enable the contact arrangement to be properly drawn into the conductor tube, thus enabling the sealing plug to sealingly engage the inside wall of the conductor tube, different means may be employed, e.g. as discussed herein. The sealing plug may be provided with a sealing means e.g. a circumferential O-ring arranged to be pressed against the inside wall of the conductor tube when the sealing plug is sealingly engaging said inside wall, thus further improving the sealing ability of the sealing plug.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
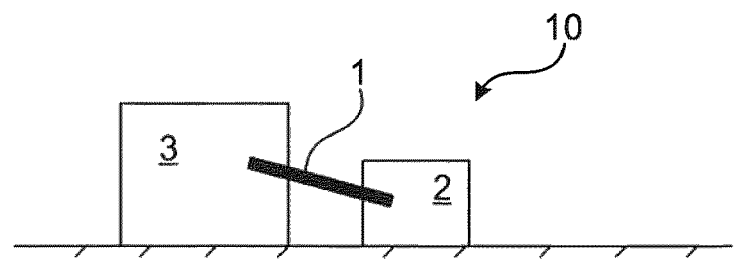
FIG. 1 is a schematic sectional side view of an electrical system comprising a liquid-filled electrical device, e.g. a transformer, connected via a bushing to e.g. a valve hall, in accordance with an embodiment of the present disclosure.

FIG. 1 illustrates an embodiment of an electrical system 10 comprising a liquid-filled electrical device 2, e.g. a transformer, connected via a bushing 1, i.e. a transformer bushing, to e.g. a valve hall 3. For instance, the bushing 1 may be for valve hall converter or rectifier where the transformer is placed outdoor and the bushing is passing through the wall into the valve hall 3. The bushing 1 may e.g. be connected via a turret of a tank of the electrical device 2. Herein, the electrical device 2 is as an example assumed to be a transformer, filled with an insulation liquid (e.g. transformer oil and/or an ester liquid), typically a high-voltage (HV) transformer. Thus, the bushing 1 may be a wall bushing arranged for allowing an electrical conductor to pass through a wall of the transformer tank. The same bushing 1 may then be used for connecting the transformer through a wall of the valve hall 3, or a separate bushing may be used for passing an electrical conductor through the wall of the valve hall.

FIGS. 2-6 illustrate different stages as a contact arrangement 26 is drawn into a conductor tube 20 of a bushing 1 by means of a draw-rod 22. For instance, the contact arrangement 26, electrically connected to operational parts of the electrical device 2, in the following exemplified as a transformer 2, may be resting within the transformer tank of the transformer 2 when the lower end (which is the end shown in FIGS. 2-6) of the bushing 1 is introduced into the transformer tank, typically via a turret thereof. The conductor tube 20 of the bushing is in the form of a tube, thus being hollow and defining a longitudinal through hole within said conductor tube which is typically also sealed at the top of the bushing. The bushing 1 is provided with a draw-rod mechanism, comprising a draw-rod 22 running through a support tube 21 which is arranged within and along the longitudinal hole formed in the conductor tube 20. The support tube 21 is typically concentrically arranged within the conductor tube 20. The draw-rod 22 is connected to the contact arrangement 26, allowing the contact arrangement to be drawn towards the conductor tube 20 to enable electrically connecting an electrical contact 29 of the contact arrangement 26 to the conductor tube 20, thus electrically connecting the transformer with the bushing 1.

Figure 7:
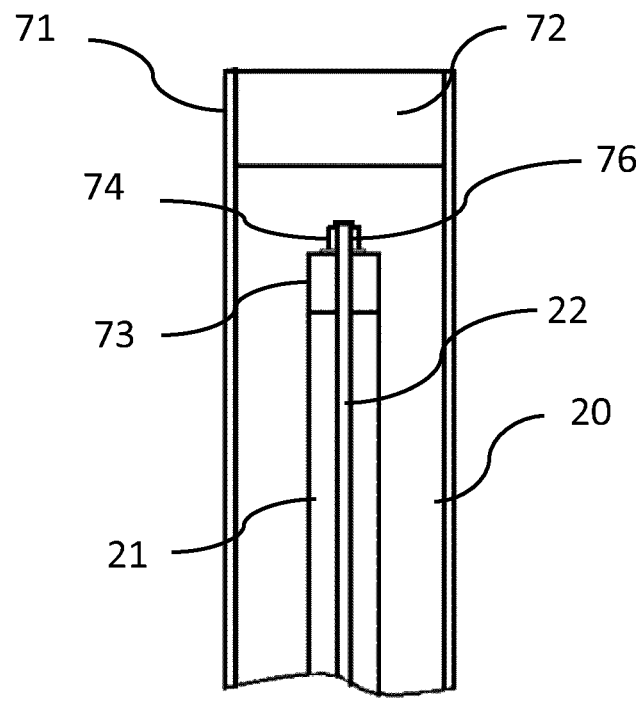
FIG. 7 is a schematic cross section view of a longitudinal direction of a conductor tube with a contact arrangement at the bottom end of the conductor tube and a fastening means at the top end of the conductor tube. The bottom end and the top end are disclosed in the Figure with the middle part removed.
Figure 7:
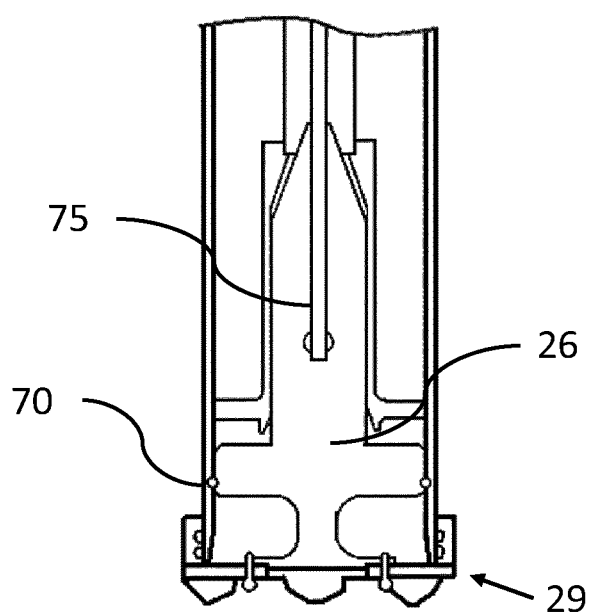

FIG. 7 is a schematic cross section view of a longitudinal direction of a conductor tube 20. The bottom end and the top end are disclosed in the Figure with the middle part removed. The lower end of the bushing is the bottom end of the bushing which may be arranged at the bottom of the transformer tank. The opposite end of the bushing may be considered as the top end of the bushing. In the same manner the lower end of the conductor tube 20 arranged in the lower end of the bushing may be considered as the bottom end 70 of the conductor tube 20. The opposite end of the conductor tube may be considered as the top end 71 of the conductor tube 20.

FIG. 7 discloses a cross section view of a conductor tube 20 with a contact arrangement 26 at the bottom end 70 of the conductor tube 20 and on the opposite side of the conductor tube 20 is the top end 71 of the conductor tube 20. In the top end 71 of the conductor tube 20 is a sealing unit 72 arranged. The lower part of FIG. 7 is also disclosed in e.g. FIG. 6. The reference numbers are the same, but all are not inserted in FIG. 7. Some reference numbers have been inserted in the upper part of FIG. 7 which are the same as in the lower part of FIG. 7 since the parts extend from the lower part to the upper part.

The support tube 21 may be fixed in relation to the conductor tube 20 by a bottom flange 25, fastened to the bottom end 31 of the support tube as well as to the inside of the conductor tube, e.g. along the whole circumference of the conductor tube possibly sealingly to prevent transformer liquid from entering the conductor tube outside and/or inside of the support tube. The bottom flange 25 may define a docking tube 23, opening to the inside of the support tube and arranged to receive a front part 26a of the contact arrangement 26, said front part, typically at least partly in the form of a circular cylinder, comprising a guiding cone 27. The docking tube 23 may be delimited, typically at its innermost part opening into the support tube 21, by a conical inner surface 24 which may be arranged to receive or mate with the guiding cone 27.

In accordance with the present disclosure, the contact arrangement comprises a sealing plug 28 arranged for sealingly engaging an inside wall of the conductor tube 20 to prevent liquid from passing the sealing plug from the transformer 2 into the conductor tube, e.g. into the support tube 21. The sealing plug may be made of a flexible material comprising or consisting of a polymeric material. The polymeric material may be rubber or a plastic material. The sealing plug may comprise or consist of a polymeric material, e.g. rubber or plastic material.

The bushing 1 typically also comprises other parts, which are not specifically shown in FIGS. 2-6 but which are conventional, e.g. a condenser core arranged outside of the conductor tube 20 to modify the electrical fields formed by a current flowing through the conductor tube, and/or an outer insulating sleeve to insulate and protect the bushing from its surroundings.

Figure 2:
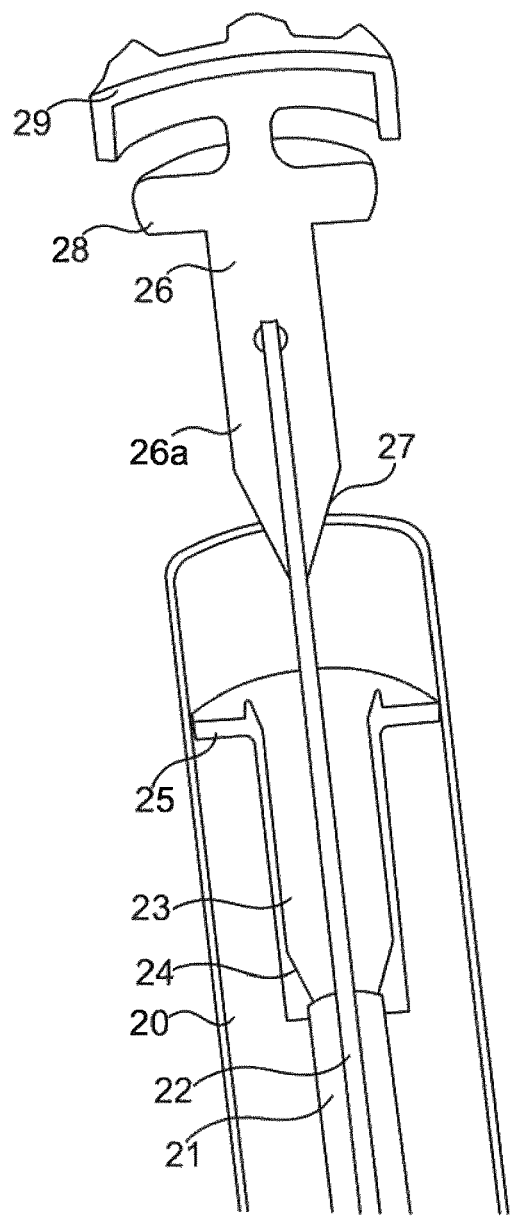
FIGS. 2-6 are each a schematic detail of a bottom end of a bushing, including its contact arrangement, in longitudinal section (FIGS. 2 and 3 in slight perspective), each figure showing respective stages as the contact arrangement is drawn into the conductor tube.

At the stage schematically illustrated in FIG. 2, the draw-rod 22 has drawn the contact arrangement 26 so close that the guiding cone 27 is starting to enter the conductor tube 2 but has not yet reached the bottom flange 25.

Figure 3:
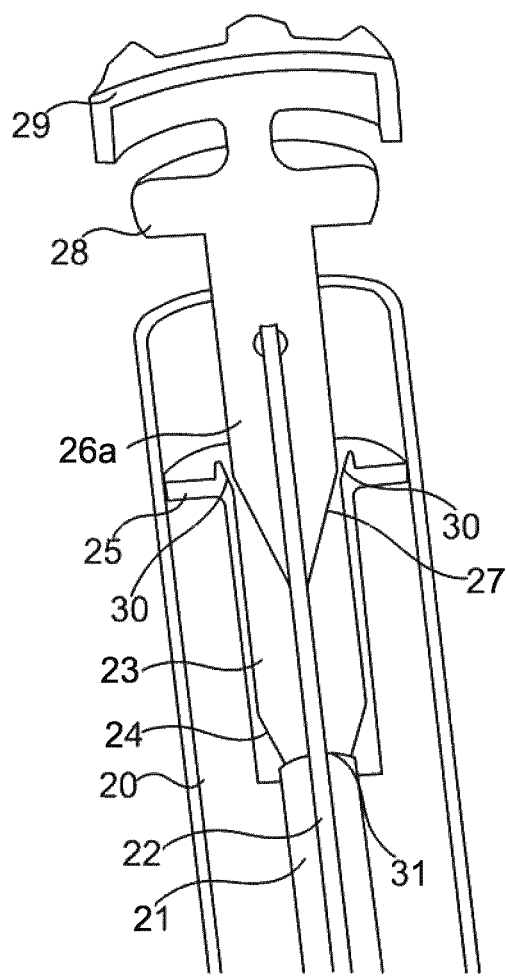

At the stage schematically illustrated in FIG. 3, the draw-rod 22 has drawn the contact arrangement 26 so close that the guiding cone 27 is starting to enter the docking tube 23. To facilitate the front part 26a of the contact arrangement 26 into the docking tube 23, especially if the diameter of the docking tube is about the same (or only slightly larger) as the diameter of the cylindrical front part 26a, the docking tube 23 may at its end distal to the support tube 21 be defined by an end chamfer (preferably circumferential) in the bottom flange 25 for interacting with the guiding cone 27 for guiding the front end 26a of the contact arrangement 26 into the docking tube, as illustrated in FIG. 3.

Figure 4:
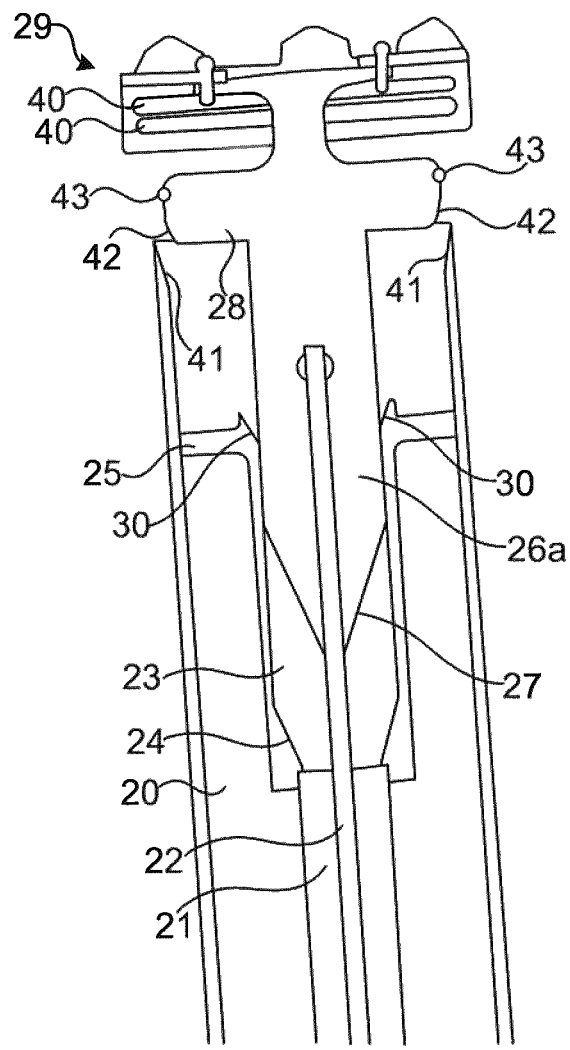

FIG. 4 illustrates that while the front end 26a of the contact arrangement 26 continues to enter the docking tube 23, the sealing plug 28 starts to enter the conductor tube 20. To facilitate the sealing plug 28 entering the conductor tube, the sealing plug may comprise a leading conical surface 42 arranged to interact with an end chamfer 41 (typically circumferential) of the conductor tube 20 for guiding the sealing plug 28 into the conductor tube. Illustrated in FIG. 4 is also an optional circumferential sealing element 43, e.g. comprising an O-ring arranged in a circumferential recess, in the sealing plug 28. In some embodiments, the sealing element 43 may comprise a plurality of O-rings and/or comprise any other sealing means. Also illustrated in FIG. 4 are electrical contact elements 40, e.g. contact spiral springs, in the electrical contact 29 of the contact arrangement 26, arranged for providing a good electrical connection to the conductor tube 20.

Figure 5:
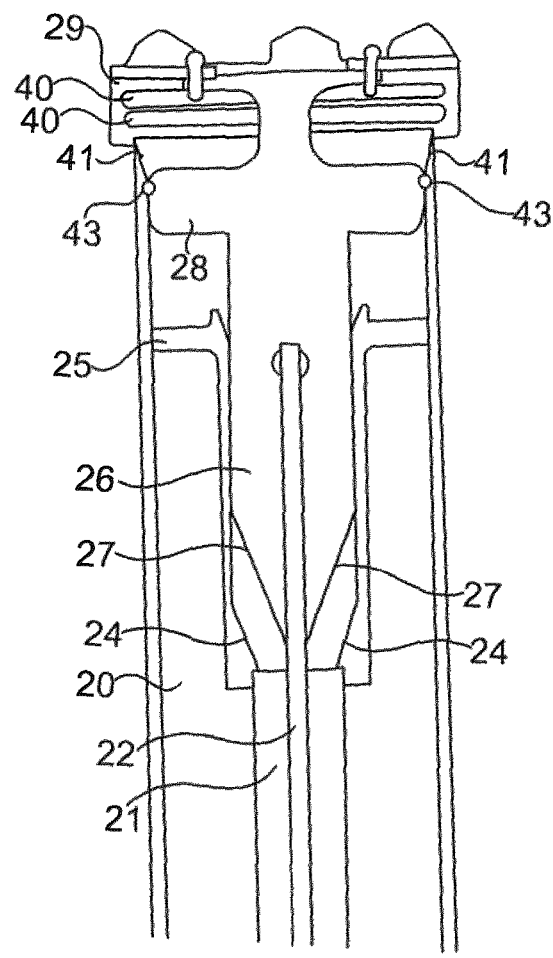

FIG. 5 illustrates a stage when the sealing plug 28, e.g. by means of a sealing element 43, sealingly engages the inside wall of the conductor tube 20, preferably along the whole circumference of the sealing plug, thus preventing liquid to pass the sealing plug into the conductor tube 20 e.g. into the support tube 21.

Figure 6:
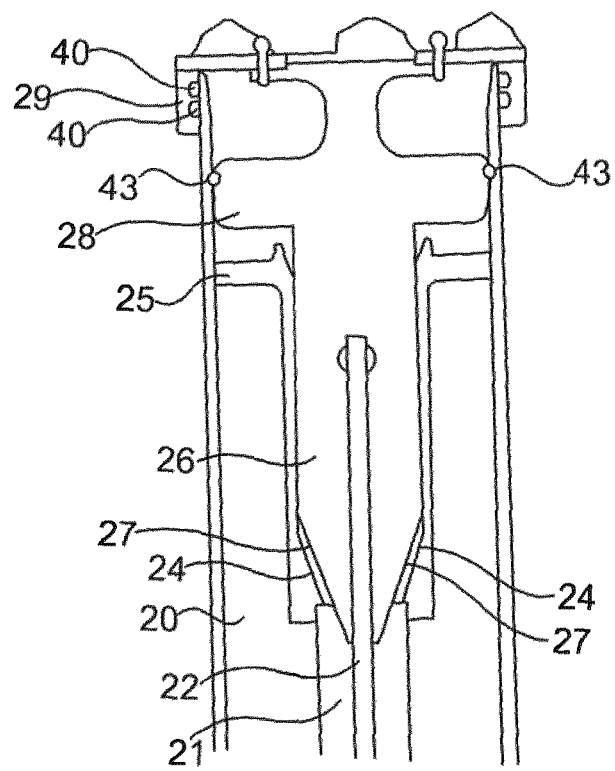

At the situation illustrated in FIG. 6, the contact arrangement has been pulled to its final position. The sealing plug 28 sealingly engages the inner surface of the conductor tube 20 to prevent liquid from passing the sealing plug 28 into the conductor tube, and the electrical contact 29 electrically connects with the conductor tube 20, e.g. by the electrical contact elements 40 engaging the outside of the conductor tube 20, at the bottom end of the bushing 1, as illustrated in the figure. The contact arrangement 26 has been drawn or pulled into the conductor tube 20 in the bottom end 70 by the draw-rod 22 from the top end 71 of the conductor tube 20. When the contact arrangement 26 is drawn to the sealing position the draw-rod 22 is tightened in the top end 73 of the support tube 21. The top end 76 of the draw-rod 22 is the end of the draw-rod arranged in the top end of the conductor tube 20.

By means of the sealing plug 28, liquid such as transformer liquid can be prevented from entering the conductor tube, thus allowing the bushing to be dry and prevent leakage of the liquid into e.g. a valve hall 3. To facilitate the insertion of the sealing plug into the converter tube by means of a draw-rod, various guiding elements may be used, as discussed above, e.g. a docking tube 23 arranged to receive a front end 26a of the contact arrangement 26, a guiding cone 27 comprised in the front end 26a in order to guide the front end 26a into the docking tube 23, an end chamfer 30 of the docking tube 28 for interacting with the guiding cone 27 for further facilitating the guiding of the front end 26a into the docking tube 23, a conical inner surface 24 of the docking tube for receiving the guiding cone 27, a leading conical surface 42 of the sealing plug 28 for guiding the sealing plug into the conductor tube 20, and/or an end chamfer 41 of the conductor tube arranged to further facilitate the guiding of the sealing plug 28 into the conductor tube 20. These guiding elements, each by itself or in combination with each other, facilitate sealingly fitting the sealing plug 28 in the conductor tube. Of course, it may be possible to sealingly fit the sealing plug also without the aid of these guiding elements, or by means of other guiding elements, but it would likely be more difficult.

The contact arrangement 26, comprising an electrical contact 29, is drawn or pulled into the conductor tube 20. The electrical contact 29 of the contact arrangement may be considered as a bottom contact. The electrical contact 29 is the contact which may be connected to the transformer leads, which may be arranged in the lower part of the transformer. This is desired when mounting the bushing to the transformer. The bottom contact 29 can be connected to the leads of the transformer. This may be done by an operator. The operator reaches into the transformer tank through a transformer tank opening in a transformer wall. The transformer tank opening is intended for later arranging of the bushing at this opening. After the bottom contact is connected to the transformer leads, and the draw-rod is mounted to the bottom contact, then the bushing can be mounted to the transformer. The draw-rod system makes it possible to mount a bushing to certain transformer designs where it otherwise is impossible to get access to the connection point between the bushing and the bottom contact in the case where the bottom contact is already mounted in the transformer prior to the mounting of the bushing itself.

A contact arrangement 26 is arranged to be drawn into the conductor tube 20 by the draw-rod 22. The contact arrangement 26 is drawn into the conductor tube 20 in the bottom end 70 of the conductor tube 20 which is arranged in the same side as the bottom end of the bushing. The draw-rod 22 is drawn from the top end 71 of the conductor tube 20. In order to be able to draw or pull the draw-rod 22, the sealing unit 72 needs to be removed. The draw-rod 22 is then tightened or secured in the top end 73 of the support tube 21. The draw-rod 22 is tightened by a fastening means 74, which could be e.g. a nut 74. The draw-rod 22 may thus be tightened by a nut 74 that is mounted on the threads of the top end 76 of the draw-rod 22. After tightening the draw-rod 22 in the top end 73 of the support tube 21 the sealing unit 72 is put back into the conductor tube 20.

Further, the contact arrangement 26 may be separable from the bottom end 70 of conductor tube 20 and the bottom end of the bushing. This may be desired in case the bushing should be exchanged. The separation may be achieved from the top end 71 of the conductor tube 20 by untightening the nut 74 previously mentioned.

The sealing unit 72 needs to be removed to be able to untighten the nut or fastening means 74. The contacts are connected to the leads of the transformer. This simplifies the separation of the contacts and leads from the bushing. With this solution it is always possible to remove or to mount the bushing on the transformer without staff going inside the tank in order to tighten or untighten the bottom contact 29 to the bushing and still have no oil inside the bushing tube. The method may further comprise to draw the contact arrangement 26 into the conductor tube 20 by tightening or fastening the draw-rod 22 in the top end 73 of the support tube 21. The method comprises to tighten or fasten the draw rod 22 by securing the draw-rod 22 by a fastening means 74, such as a nut, that is mounted on an upper end 73 of the support tube 21. The upper part of the draw rod may have a thread on it to which the nut 74 is mounted and tightened by screwing the nut 74 on the draw-rod 22.

The contact arrangement 26 is arranged to be drawn into the conductor tube 20. The contact arrangement 26 is arranged to be drawn into the conductor tube 20 from the top end 74 of the conductor tube 20. The contact arrangement 26 is arranged in the bottom end 70 of the conductor tube 20 and is arranged in the bottom end 75 of the draw-rod 22. The other end, the top end 76, of the draw-rod 22, is arranged in the top end 71 of the conductor tube 20. The top end 76 of the draw-rod 22 is at the same time arranged in the top end 73 of the support tube 21. By the draw-rod 22 the contact arrangement 26 is drawn into the conductor tube 20 and the draw-rod 22 is tightened and secured in the top end 71 of the conductor tube 20 at the top end 76 of the draw-rod 22.

The top end of the bushing is the end of the bushing which may be connected to powerlines, e.g. in the network, switchyard and DC (direct current) rectifiers or DC converters.

The transformer may be a transformer for DC applications.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A bushing comprising:
   a conductor tube;
   a support tube, arranged within the conductor tube;
   a draw-rod configured to run through the support tube; and
   a contact arrangement arranged to be drawn into the conductor tube by the draw-rod;
   wherein
   the support tube is fixed in relation to the conductor tube by a bottom flange, fastened to the bottom end of the support tube and to the inside of the conductor tube, and
   the contact arrangement comprises an electrical contact and the contact arrangement comprises a sealing plug arranged for sealingly engaging an inside wall of the conductor tube to prevent liquid from passing the sealing plug into the conductor tube wherein the contact arrangement comprises a front guiding cone for guiding a front of the contact arrangement into a docking tube connected to an end of the support tube and wherein the docking tube comprises a conical inner surface, tapering towards the end of the support tube, for receiving the guiding cone of the contact arrangement.

2. The bushing of claim 1, wherein the sealing plug is provided with an outer, circumferential sealing element.

3. The bushing of claim 1, wherein the sealing plug comprises a leading conical surface arranged to interact with an end chamfer of the conductor tube for guiding the sealing plug into the conductor tube.

4. The bushing of claim 1, wherein the docking tube comprises an end chamfer, distal to the support tube, for interacting with the guiding cone for guiding the front of the contact arrangement (26) into the docking tube.

5. A power station comprising:
   an electrical equipment; and
   the bushing of claim 1, arranged through a wall of the electrical equipment.

6. The power station of claim 5, wherein the electrical equipment comprises a liquid-filled transformer or reactor.

7. The power station of claim 5, further comprising a valve hall housing an electrical power converter, wherein the bushing is also arranged through a wall of the valve hall.

8. A method of electrically connecting a contact arrangement to a conductor tube of a bushing, the method comprising:
   by means of a draw-rod running through a support tube arranged within the conductor tube, the support tube being fixed in relation to the conductor tube by a bottom flange fastened to the bottom end of the support tube and to the inside of the conductor tube, the draw-rod pulling the contact arrangement into the conductor tube, wherein the conductor arrangement comprises a front guiding cone for guiding a front of the contact arrangement into a docking tube connected to an end of the support tube and wherein the docking tube comprises a conical inner surface, tapering towards the end of the support tube, for receiving the guiding cone of the contact arrangement, and pulling the contact arrangement into the conductor tube until an electrical contact of the contact arrangement electrically connects with the conductor tube and a sealing plug of the contact arrangement sealingly engages an inside wall of the conductor tube, preventing liquid from passing the sealing plug into the conductor tube; and
   enabling the electrical contact of the contact arrangement to be connected to electrical equipment leads.

9. The method of claim 8, further comprising securing the draw-rod in the conductor tube.

10. The method of claim 9, wherein securing the draw-rod in the conductor tube comprises securing a top end of the draw-rod at a top end of the conductor tube.

11. The method of claim 10, wherein securing a top end of the draw-rod at a top end of the conductor tube comprises tightening the top end of the draw-rod by a fastening means.

12. The method of claim 11, wherein tightening the top end of the draw-rod by a fastening means comprises tightening the top end of the draw-rod by a nut mounted on threads of the top end of the draw-rod.

13. The method of claim 9, further comprising placing a sealing unit into the top end of the conductor tube.

14. The bushing of claim 2, wherein the outer, circumferential sealing element comprises an O-ring, arranged to be pressed against the inside wall of the conductor tube.

15. The bushing of claim 1, wherein the draw-rod is configured to be secured in the conductor tube.

16. The bushing of claim 15, wherein a top end of the draw-rod has threads for receiving fastening means to secure the draw-rod in the conductor tube.

17. The bushing of claim 16, wherein the fastening means comprises a nut and the draw-rod is secured by mounting the nut to the threads and the draw-rod is secured by screwing the nut onto the threads of the draw-rod.

18. The bushing of claim 1, wherein the bushing further comprises a top end configured to be connected to one or more powerlines.

19. The bushing of claim 1, wherein the electrical contact comprises electrical contact elements in the electrical contact of the contact arrangement arranged for providing electrical connection to the conductor tube.

20. The bushing of claim 19, wherein the electrical contact elements comprise contact electrical springs.

* * * * *